United States Patent [19]

Monahan

[11] 3,967,718
[45] July 6, 1976

[54] LIVE ROLLER CONVEYOR

[75] Inventor: Carl M. Monahan, Williamsport, Ohio

[73] Assignee: Versa Corporation, Sterling, Ohio

[22] Filed: Jan. 17, 1975

[21] Appl. No.: 541,856

[52] U.S. Cl............................................. 198/127 R
[51] Int. Cl.²....................................... B65G 13/02
[58] Field of Search........... 198/127 R, 202; 74/221, 74/226, 242.1 R

[56] References Cited
UNITED STATES PATENTS

| | | | |
|---|---|---|---|
| 3,066,547 | 12/1962 | Evans et al. ...................... | 198/202 |
| 3,323,636 | 6/1967 | Gotham ........................... | 198/127 R |
| 3,616,894 | 11/1971 | Koennecke et al. ............. | 198/127 R |
| 3,643,788 | 2/1972 | Werntz.............................. | 198/127 R |
| 3,687,273 | 8/1972 | Macone et al. ................... | 198/202 |
| 3,770,102 | 11/1973 | DeGood........................... | 198/127 R |

Primary Examiner—John J. Love
Assistant Examiner—Joseph E. Valenza
Attorney, Agent, or Firm—Fishburn, Gold & Litman

[57] ABSTRACT

The drive belt in an accumulating live roller conveyor is selectively urged into and out of driving engagement with the rollers by pivoting, through an acute angle, a pair of generally vertical axis tracking wheels grippingly receiving the belt therebetween.

12 Claims, 6 Drawing Figures

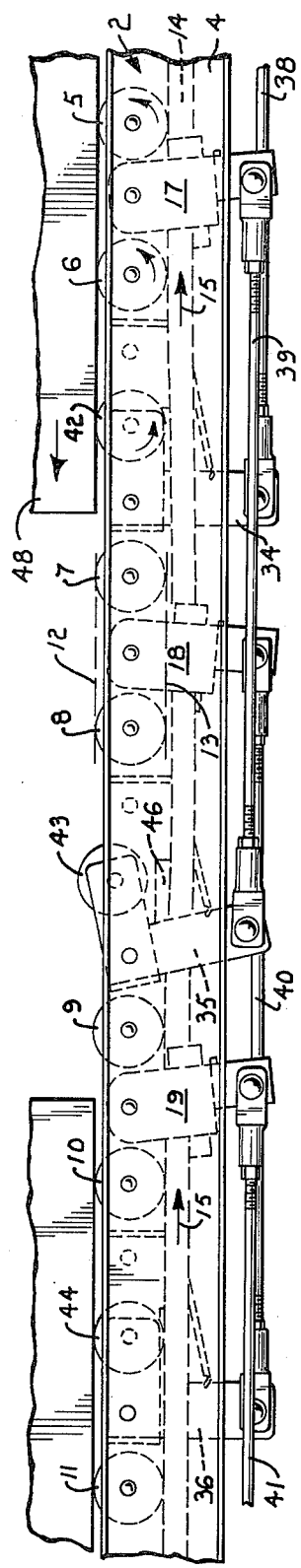
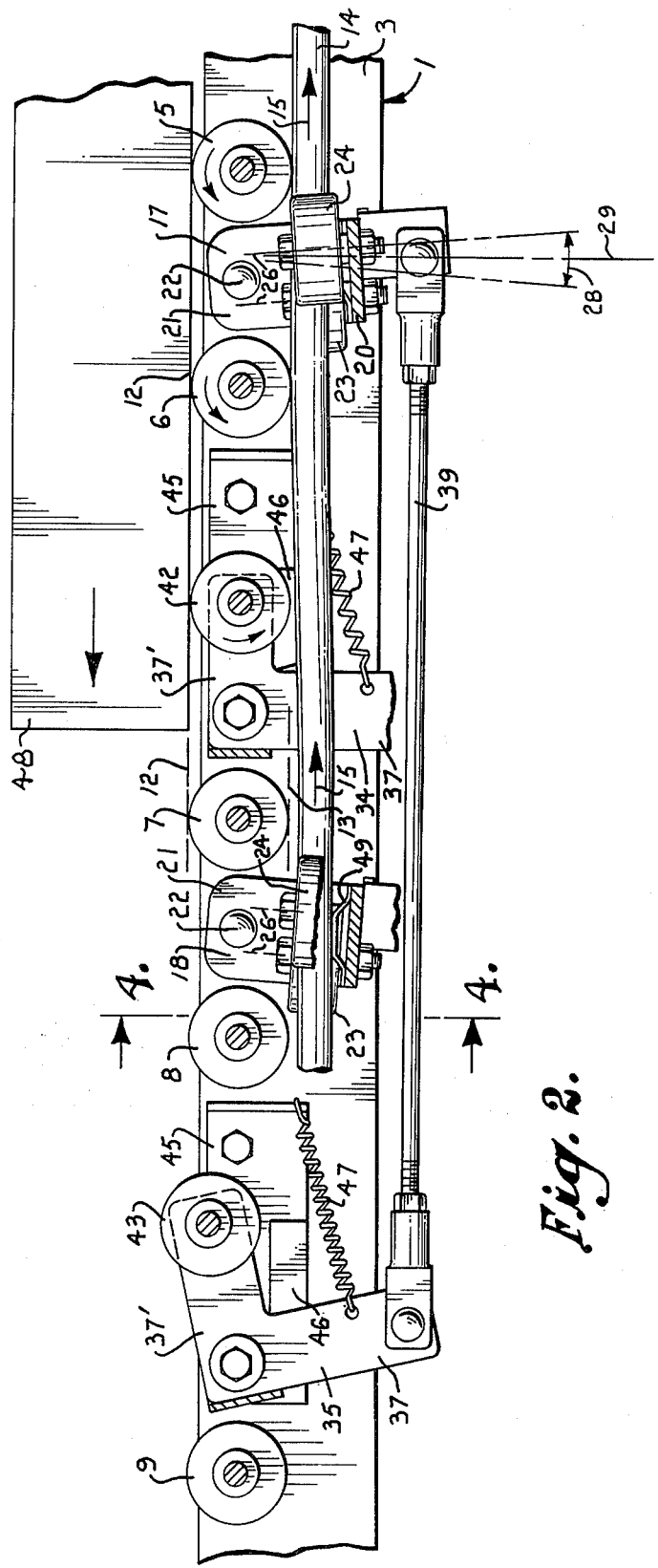
Fig. 1.
Fig. 2.

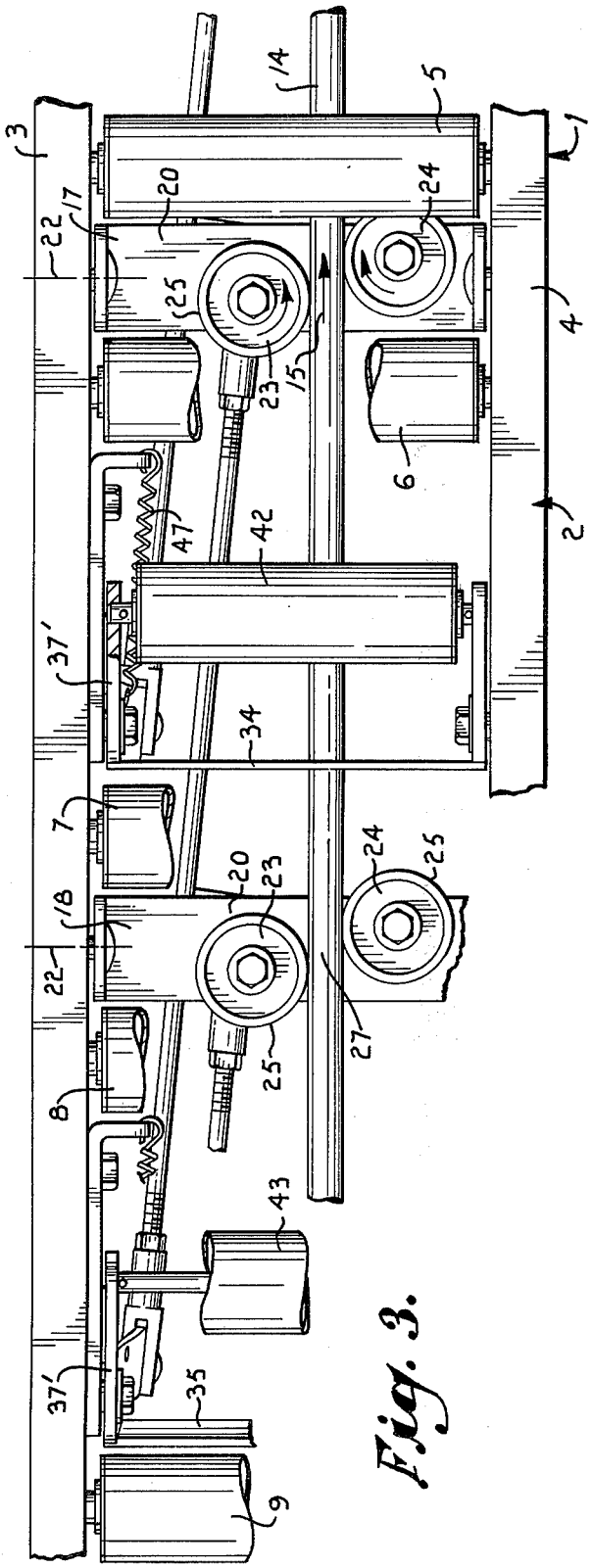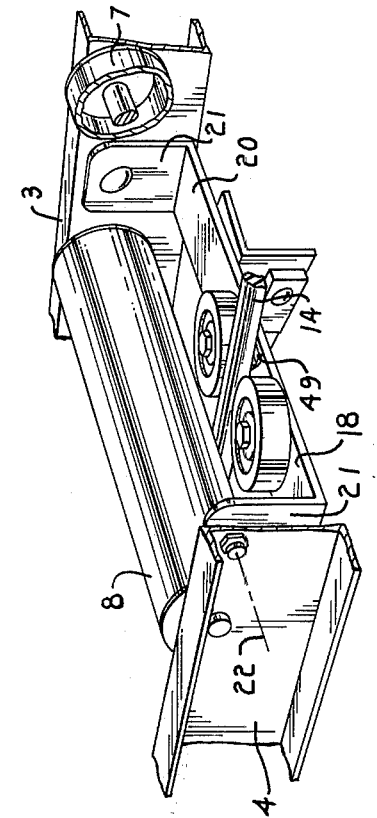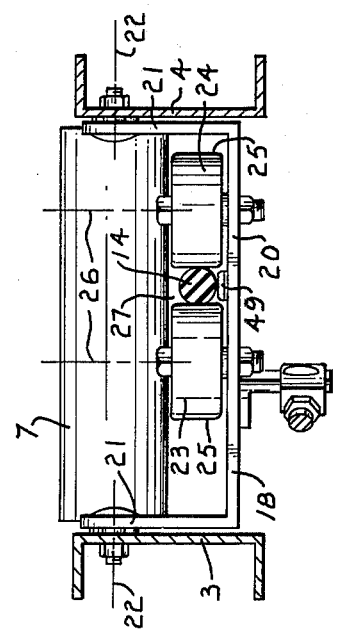

LIVE ROLLER CONVEYOR

This invention relates to power driven or "live" roller conveyors and more particularly to such conveyors which use an elongated propelling member, or belt, in selective engagement with the rollers to permit accumulating articles therealong without the necessity of stopping the propelling member.

Various conveyors capable of accumulating articles therealong, as needed, without stopping the movement of the conveyor's propelling member have been developed over the past several years. However, the need remains for such conveyors which are simpler and less expensive in construction without reducing reliability.

This invention utilizes a swinging bracket carrying pairs of spaced-apart, generally vertical axis, tracking wheels in gripping engagement with the propelling member and functioning to urge the propelling member selectively upwardly and downwardly into and out of driving roller engagement. A simple and reliable arrangement is thereby permitted which utilizes the longitudinal motion of the propelling member to directly power the necessary vertical displacement of the propelling member.

The principal objects of the present invention are: to provide a roller conveyor having a simple, efficient arrangement for producing multiple and shifting zones of accumulation in response to the existence of articles thereon; to provide means for creating such zones of accumulation without the necessity of contact between articles on the conveyor; to provide an accumulating roller conveyor which reacts rapidly and effectively to a sensed need for decoupling the propelling member from specific driving rollers; to provide such roller drive coupling and decoupling with a minimum of actuator displacement and effort; to provide such an accumulating conveyor which directly utilizes the longitudinal motion of the propelling member for powering drive engagement; to provide such an arrangement which does not require the vertical displacement for propelling member supports and the like; and to provide such an accumulating like roller conveyor which is relatively inexpensive, reliable, easily maintained and extremely well adapted for its intended purpose.

Other objects and advantages of this invention will become apparent from the following description taken in connection with the accompanying drawings wherein are set forth by way of illustration and example, certain embodiments of this invention.

FIG. 1 is a fragmentary side elevational view showing a portion of an accumulating live roller conveyor embodying this invention.

FIG. 2 is a fragmentary side elevational view similar to FIG. 1, but on a larger scale and with a portion of the frame removed to better reveal interior construction.

FIG. 3 is a fragmentary plan view of the conveyor portion on the scale of FIG. 2.

FIG. 4 is a cross-sectional and elevation of the conveyor taken on the line 4—4, FIG. 2.

FIG. 5 is a fragmentary perspective view of the conveyor tracker bracket and associated parts.

Figure 6:
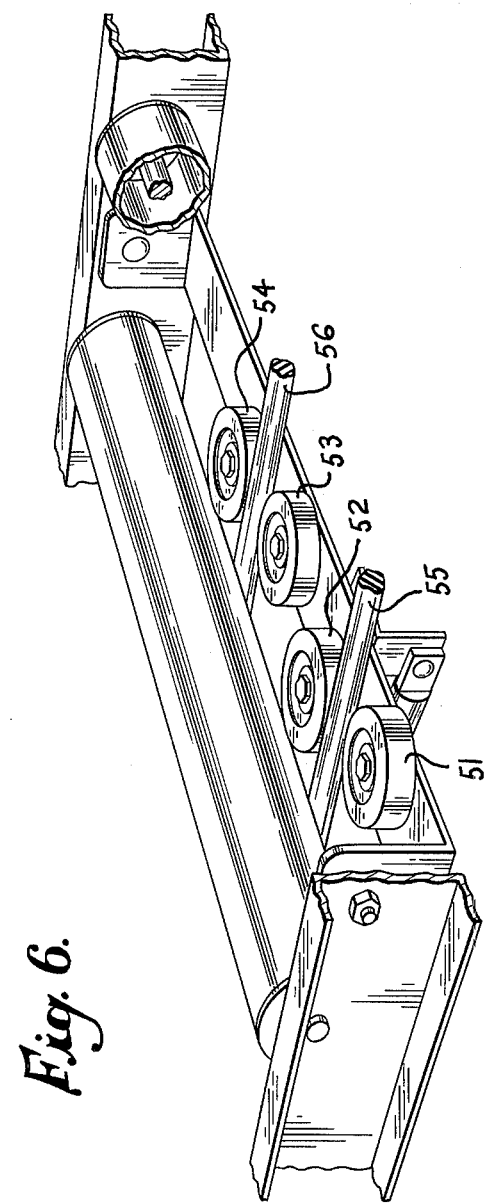
FIG. 6 is a fragmentary perspective view of a modified form of tracker bracket and associated parts.

Referring more in detail to the drawings:

The reference numeral 1 refers generally to a typical portion of an accumulating conveyor embodying this invention which, in this example, includes a frame 2 having opposed, spaced-apart channels 3 and 4. A plurality of laterally positioned, spaced apart elongated driving rollers 5-11 are rotatably mounted on the frame 2 between the channels 3 and 4, forming an upper article supporting surface 12 and a lower roller driving surface 13.

A propelling member in the form of a resilient endless belt 14, in this example, a circular cross-section best seen in FIG. 4, although other cross-sectional shapes may also be used. The belt 14 is continuously powered during conveyor operation, in the direction of the arrows 15, by suitable conventional driving structure (not shown) and extends longitudinally of the article supporting surface 12 beneath and beyond the driving rollers 5-11.

A plurality of tracker brackets are positioned at least partly below the driving surface and in laterally spaced relation along the frame 2 near at least one driving roller. In this example, typical brackets 17, 18 and 19 are shown in FIG. 1 with two driving rollers located respectively therebetween. Detailed remarks are directed particularly to brackets 17 and 18, FIG. 2. The brackets 17 and 18 each have a web or base 20 and a pair of spaced-apart wings or ears 21 projecting upwardly therefrom. The brackets 17 and 18 are pivotally mounted on the respective frame channels 3 and 4 by the ears 21 for relatively slight swinging movement of the base 20 longitudinally of the supporting surface 12 and about a transverse axis 22.

A pair of tracking wheels 23 and 24 each have, in this example, a cylindrical surface 25 and generally vertical, substantially parallel axes 26. The respective pairs of wheels 23 and 24 are rotatably mounted on the bracket base 20 in laterally spaced and slightly longitudinally offset relation, forming an aperture 27 between the surfaces 25 which is laterally sized for grippingly receiving the belt 14 therein. The pairs of wheels 23 and 24, thus mounted, have their axes 26 positioned for swinging movement with the respective tracker bracket base 20 through an acute angle 28 which passes through or traverses a generally normal plane 29 extending transversely to the supporting surface 12.

A plurality of typical lever brackets, 34, 35 and 36 being shown in FIG. 1, each have a generally downwardly extending first arm 37 and a second arm 37' projecting generally longitudinally of the supporting surface 12 in the direction of belt travel shown by the arrows 15. The lever brackets 34-36 are pivotally mounted on and between the frame channels 3 and 4 downstream respectively from their related tracker brackets, typical tracker brackets being designated 17-19. Typical tie rods 38, 39, 40 and 41 connect respective lever brackets to respective tracker brackets in mutually overlapping relation whereby the pivoting of the former produces said swinging movement of the latter.

Sensing rollers 42, 43 and 44 are respectively mounted on the lever bracket second arms 37'. The sensing rollers extend generally between the frame channels 3 and 4 and are interspaced approximately laterally between and parallel to respective adjacent driven rollers. An anchor plate 45 is secured to the frame near the respective lever brackets 34-36 and forms a stop 46 positioned to engage the bracket first arm 37 for limiting the pivoting motion thereof in the direction of belt travel. The anchor plates 45 also support one end of a tensile spring 47, the other end of which is engaged with the first arm 37 to urge same resiliently toward the adjacent stop 46.

The springs 47 simultaneously urge the sensing rollers 42-44 to a position resiliently projecting somewhat above the supporting surface 12. The sensing rollers 42-44 are thereby adapted for depression into alignment with the supporting surface 12 during passage thereover of an article, such as article 48, moving along the conveyor. This change in sensing roller elevation swings the respective tracker bracket 17-19 from the position shown for bracket 17 (FIG. 2) to the position shown for bracket 18, moving the bracket and pairs of wheels 23 and 24 through the angle 28 referred to above.

The aperture 27 formed between the pairs of rollers 23 and 24 is located adjacent the lower driving surface 13. The noted swinging of the tracker bracket through the plane 29 causes the belt gripping areas of rollers 23 and 24 to impart a vertical or transverse component of force to the belt 14, causing the belt to move upwardly or downwardly and thereby into or out of engagement with the driving surface 13. The transverse movement of the belt 14 is limited by contact with the driving rollers in the driving position and a suitable slide plate 49 in the disengaged position.

In operation, the passing of an article beyond a sensing roller, such as roller 43, FIG. 2, permits the associated tracker bracket 17 to swig counter-clockwise, causing the belt 14 to rise against the adjacent driving surface 13. This produces a rotating force on adjacent driving rollers for filling the sensed empty space downstream on the conveyor. The arrival of the article into that empty space depresses the sensing roller, causing its associated tracker bracket to swing clockwise, as illustrated by tracker bracket 18, FIG. 2, thereby urging the propelling member 14 downwardly and out of contact with the local driving surface 13. This removes the driving force on adjacent driving rollers. Thus, the drive belt 14 may be continuously propelled, however, there will be no driving of articles along the conveyor unless, and until the elevation of a downstream sensing roller indicates that a space or zone is empty and ready to receive an article therein.

A modified form of tracker bracket with associated parts is shown in FIG. 6 and departs from the above described structure in the utilization of two pairs of tracking wheels 51-52 and 53-54 respectively for two propelling members or drive belts 55 and 56. This form is desirable, for example, under conditions where frictional driving loads on the rollers are excessive for a single propelling member.

It is to be understood that, although certain forms of this invention have been illustrated and described, it is not to be limited thereto except insofar as such limitations are included in the following claims.

I claim:

1. In an accumulating roller conveyor having a plurality of spaced driving rollers forming a conveyor path:
   a. an elongated propelling member positioned generally along said path and near said rollers;
   b. a pair of spaced-apart tracking wheels each having a peripheral surface and an axis and gripping said propelling member on said surfaces therebetween; and
   c. means for selectively tilting said wheels and thereby imparting a transverse force component to said propelling member and selectively urging same along said surfaces in the general direction of said tracking wheel axes into and out of driving engagement with adjacent driving rollers.

2. The conveyor structure as set forth in claim 1 wherein:
   a. said means for tilting said wheels includes a sensing roller normally resiliently positioned out of said conveyor path and displaceable into said path in response to a conveyed article passing into contact therewith.

3. The conveyor structure as set forth in claim 2 wherein:
   a. said means for tilting said wheels includes a tie rod operably connected between said sensing roller and sand tracking wheels.

4. The conveyor structure as set forth in claim 1 wherein:
   a. said conveyor path is generally horizontal; and
   b. said propelling member is positioned beneath said driving rollers.

5. The conveyor structure as set forth in claim 1 wherein:
   a. said propelling member is a resilient drive belt generally circular in cross-section.

6. The conveyor structure as set forth in claim 1 wherein said means for selectively tilting said wheels includes:
   a. a tracking bracket mounted for swinging movement with respect to said path;
   b. said tracking wheels being rotatably mounted on said tracking bracket.

7. The conveyor structure as set forth in claim 1 wherein:
   a. said tracking wheels are spaced-apart both laterally and longitudinally of said conveyor path.

8. The conveyor structure as set forth in claim 1 wherein:
   a. said tracking wheels have generally cylindrical peripheral surfaces gripping said propelling member.

9. A conveyor comprising:
   a. a frame, a plurality of laterally spaced-apart elongated driving rollers rotatably mounted on said frame and forming an upper article supporting surface and a lower driving surface;
   b. a continuously powered propelling member extending longitudinally of said supporting surface beneath said driving rollers;
   c. a plurality of tracker brackets positioned along said frame in longitudinally spaced relation greater than said driving rollers, said brackets being pivotally mounted with respect to said frame for swinging movement generally longitudinally of said supporting surface;
   d. a pair of tracking wheels each having a peripheral surface and having generally parallel axes and being rotatably mounted on said tracker brackets in laterally spaced relation forming an aperture therebetween grippingly receiving and propelling member on said surfaces therein;
   e. said wheel axes being positioned on said tracker bracket for swinging movement therewith through an acute angle traversing a normal plane transverse to said supporting surface;
   f. a plurality of lever brackets pivotally mounted relative to said frame and downstream respectively from one of said tracker brackets, means connecting respective lever brackets to respective tracker brackets whereby the pivoting of the former produces said swinging movement of the latter;

g. a sensing roller mounted on said lever brackets, and resilient means urging said sensing roller to a position normally projecting above said supporting surface;

h. said apertures being located adjacent said lower driving surface whereby the swinging of said tracker bracket in one direction causes said propelling member to move along said surfaces in the general direction of said tracking wheel axes and engage adjacent driving rollers and the swinging of said tracker bracket in the other direction causes said propelling member to disengage from adjacent driving rollers.

10. The conveyor as set forth in claim 9 wherein:

a. said propelling member is a resilient endless belt having a generally circular cross-section.

11. The conveyor as set forth in claim 10 wherein:

a. said tracking wheels have generally cylindrical peripheral surfaces forming said aperture.

12. The conveyor as set forth in claim 9 wherein:

a. said tracker brackets have two pairs of said tracking wheels mounted thereon.

* * * * *